G. MILLER & N. J. BECKNER.
PUMP.
APPLICATION FILED JULY 27, 1912.
1,087,675.
Patented Feb. 17, 1914.
2 SHEETS—SHEET 1.
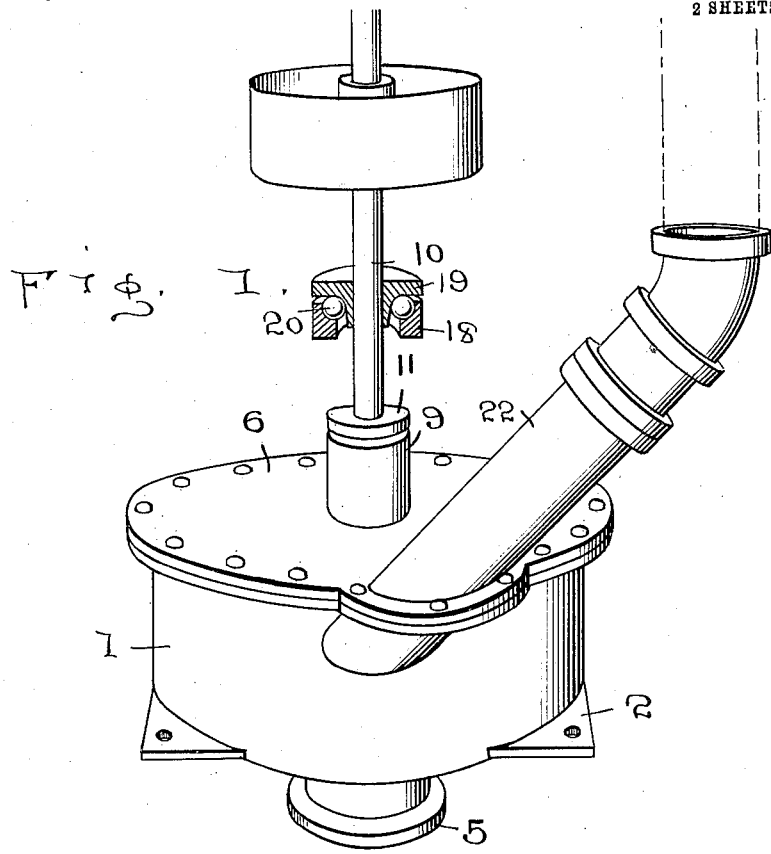
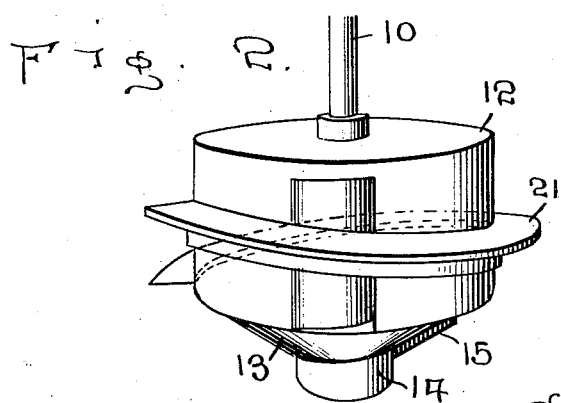
Witnesses
Thos. W. Riley
Henry S. Rogers
Inventors
G. Miller and
N. J. Beckner
By W. J. Fitzgerald & Co.
Attorneys

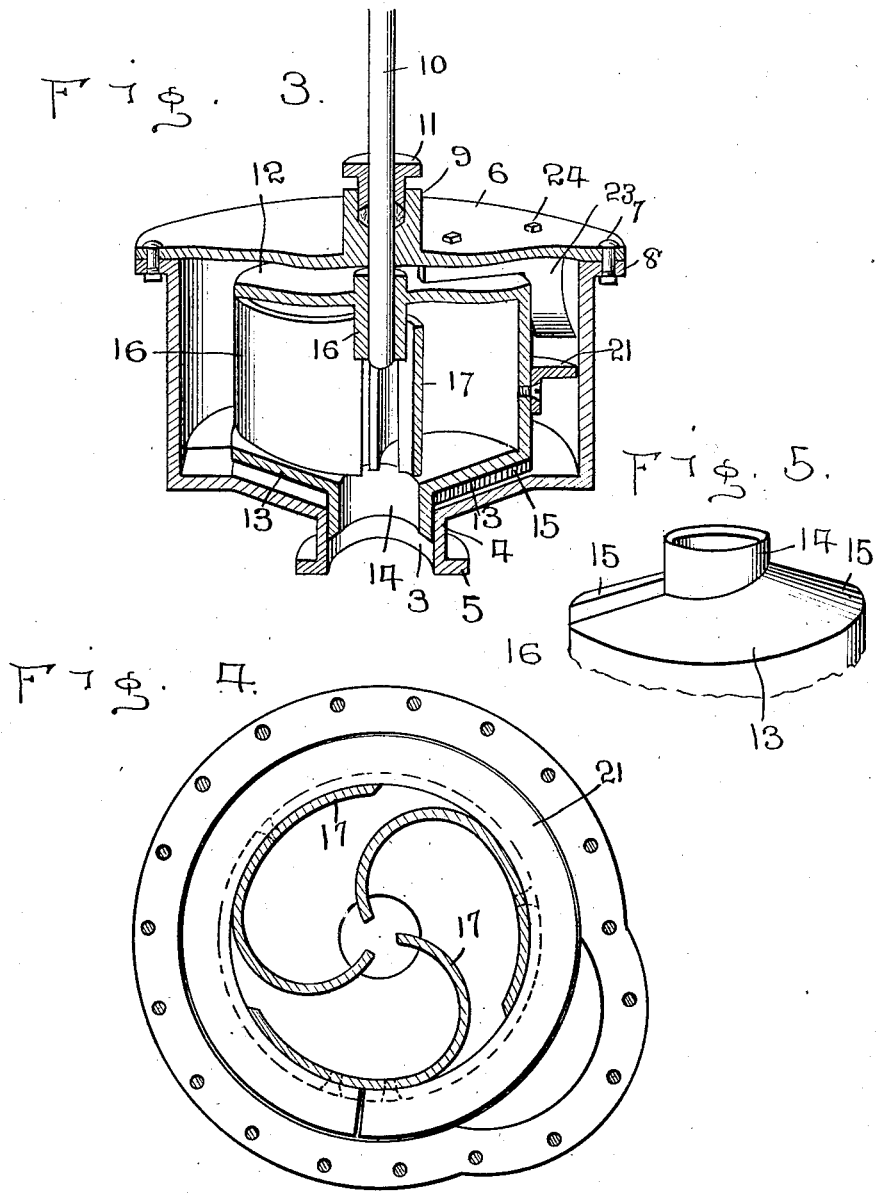

UNITED STATES PATENT OFFICE.

GEORGE MILLER AND NOAH J. BECKNER, OF MABTON, WASHINGTON.

PUMP.

1,087,675.  Specification of Letters Patent.  Patented Feb. 17, 1914.

Application filed July 27, 1912. Serial No. 711,907.

*To all whom it may concern:*

Be it known that we, GEORGE MILLER and NOAH J. BECKNER, citizens of the United States, residing at Mabton, in the county of Yakima and State of Washington, have invented certain new and useful Improvements in Pumps; and we do hereby declare the following to be a full, clear, and exact description of the invention, such as will enable others skilled in the art to which it appertains to make and use the same.

Our invention relates to new and useful improvements in pumps and more particularly to centrifugal pumps.

The object of our invention is to provide a pump of the class described which is adapted to handle heavy liquids or liquids containing coarse particles, as well as light fluids such as water.

Other objects and advantages of our invention will be hereinafter set forth in the specification and pointed out in the claims.

In the accompanying drawings we have shown the preferred embodiment of our invention.

In said drawings, Figure 1 is a perspective view of our invention. Fig. 2 is a perspective view of the rotary member of the pump. Fig. 3 is a vertical sectional view through the casing and rotary member. Fig. 4 is a top plan view of the casing with the cover removed, portions of the rotating member being shown in section, and, Fig. 5 is a perspective view of the bottom of the driving member.

Referring to the drawings in which similar reference numerals designate corresponding parts throughout the several views, 1 indicates a housing provided with flanges 2, by means of which the same may be secured to a suitable pedestal or support. The housing 1 is substantially circular in cross section and is preferably arranged vertically, as shown. Said housing is provided, on one of its sides, with an inlet opening 3. A collar 4 preferably surrounds the inlet opening, the outer end of which is provided with an outwardly extending flange 5, which is adapted to be bolted or otherwise secured to any preferred form of conduit pipe. The upper side of the housing is formed by a cover 6, which is removably secured to the housing in any preferred manner, as by bolts 7, which pass through said cover and through a peripheral flange 8 on said housing. The cover 6 is provided centrally with a sleeve 9 adapted to form a bearing for a shaft 10. The upper end of the sleeve 9 is recessed to receive a sleeve 11. The space between the end of the sleeve 11 and the inner end of the enlarged portion in the sleeve 9 is adapted to be filled by suitable packing.

The impeller casing is substantially cylindrical in form and comprises end disks 12 and 13 and driving blades secured therebetween. The disk 13 is preferably slightly tapered downwardly from its outer edge to the central portion thereof. The disk 13 has an opening formed centrally thereof and is provided with an outwardly extending collar 14, which extends into the intake aperture 3 of the casing. The disk 13 is spaced a slight distance from the lower portion of the housing 1 and is provided on its under surface with oppositely disposed shoulders 15, the bottom of said casing tapering helically from the outer end of one of said shoulders to the base of the oppositely disposed shoulder. The shoulders are arranged upon the lower portion of the disk 13 in a manner hereinafter more clearly set forth. The disk 12 is provided with a sleeve 16 which is keyed or otherwise rigidly secured to the shaft 10 and is adapted to be driven thereby.

Secured to or integral with the end disks 12 and 13, are a plurality of driving blades 17, said driving blades beginning near the axial center of the driving member and extending spirally therefrom to the outer periphery of said member, as clearly shown in Fig. 4 of the drawings.

As shown in the drawings, the driving member is adapted to be rotated in a contra-clock-wise direction and the shoulders on the disk 13 thereof are arranged so that the inclined surface therebetween will be directed against the water or other liquid in the lower portion of the casing. By arranging the inclined surfaces, as described, the same will act upon the water in the lower portion of the casing and help carry the weight of the driving member. The weight of the driving member is carried by a suitable anti-friction bearing, comprising a lower member 18 rigidly supported in any desired manner and an upper member 19 rigidly secured to the shaft. Suitable anti-friction devices, such as balls 20, are interposed between the two bearing members. Secured to the outer ends of the driving blades 17 is an elevating screw member 21. The member 21 is arranged spirally around the driving member, one end thereof being secured to or near the disk 13 and the other end to the driving blades near the disk 12 so that, when the driving drum is rotated, the contents will be moved toward one end of said housing. As shown in the drawing, the member 21 is arranged to move the contents of the housing toward the upper or discharge side thereof.

The housing and cover are provided at one point with an opening adapted to receive a discharge pipe 22, through which the contents of the pump are forced. The cover 6 is provided with a depending stop 23, which is secured thereto in any preferred manner, as by bolts 24. The stop 23 is arranged upon the cover to one side of the discharge pipe 22 and just clears the member 21. The stop 23 is adapted to prevent the liquid from circulating around inside of the housing.

When in operation, the shaft 10 is rotated from any desired source of power (not shown) and the blades 17, due to their peculiar shape, will draw the liquid through the intake 3 of the opening into said housing. At the same time the screw member 21 will force the liquid to the upper end of the housing, the liquid being discharged therefrom through the pipe 22.

With our construction of centrifugal pump, we are enabled to handle thicker and coarser materials than is usually the case. With the ordinary form of centrifugal pump, it is practically impossible to handle liquids containing sand, gravel and like material, as such materials tend to collect in the outer portion of the casing and clog the driving blades. In our construction, however, by the use of the elevating screw member 21, such accumulation is prevented, said member moving such particles toward the discharge opening, through which said particles are drawn by the rush of liquid through the pump.

From the foregoing, it will be seen that we have provided a simple, compact structure and one which will be very efficient in use. It will further be seen that our centrifugal pump may be used in many places when it is impossible to use the pumps of ordinary construction.

What we claim is:—

1. In a rotary pump, the combination with a casing having a centrally disposed inlet and a peripherally arranged outlet, of a driving member rotatably mounted in said casing, a plurality of blades arranged spirally in said driving member and a helically arranged driving member secured to the outer ends of said blades.

2. In a rotary pump, the combination with a casing having an inlet opening in one side and an outlet opening at the upper surface of said casing, of a driving member, a collar on one side of said driving member journaled in said inlet opening, a driving shaft extending through said casing and secured to the opposite side of said driving member, a plurality of blades arranged spirally of said driving member and means secured to said driving member adapted to move the contents of the casing to one side thereof.

3. In a rotary pump, the combination with a casing, of a driving member rotatably mounted therein, said driving member comprising end disks, a plurality of driving blades arranged between said end disks and extending spirally from the axial center of said disks, means on said driving blades adapted to direct the contents of the casing toward one side thereof and a deflector on said casing.

4. In a centrifugal pump, an impeller having a spirally disposed blade on its periphery and having shoulders on its bottom surfaces and being upwardly inclined in the direction of rotation between the shoulders.

5. In a centrifugal pump, a pump casing, an impeller rotatable on a vertical axis within the casing, a helically disposed lifter blade mounted on the periphery of the impeller, the bottom of the pump casing being inclined toward the axis of the impeller for receiving the liquid by gravity, and the bottom of said impeller being provided with inclined surfaces for riding upon the liquid on the inclined bottom of the pump casing.

In testimony whereof we have signed our names to this specification in the presence of two subscribing witnesses.

GEORGE MILLER.
NOAH J. BECKNER.

Witnesses:
T. W. HOWELL,
JACOB M. PHILIPPI.